United States Patent
Liang (10) Patent No.: US 8,764,260 B2
(45) Date of Patent: Jul. 1, 2014

(54) LIGHT-GUIDING COVER AND ILLUMINATION DEVICE HAVING THE SAME

(75) Inventor: Chun-Wei Liang, New Taipei (TW)

(73) Assignee: Lite-On Technology Corporation, Taipei (TW)

( * ) Notice: Subject to any disclaimer, the term of this patent is extended or adjusted under 35 U.S.C. 154(b) by 112 days.

(21) Appl. No.: 13/339,228

(22) Filed: Dec. 28, 2011

(65) Prior Publication Data

US 2012/0320580 A1 Dec. 20, 2012

Related U.S. Application Data

(60) Provisional application No. 61/497,090, filed on Jun. 15, 2011.

(51) Int. Cl.
| | |
|---|---|
| *F21V 7/04* | (2006.01) |
| *H01L 33/00* | (2010.01) |
| *F21V 5/00* | (2006.01) |
| *F23D 3/16* | (2006.01) |
| *F21S 4/00* | (2006.01) |
| *F21V 21/00* | (2006.01) |
| *F21V 3/00* | (2006.01) |

(52) U.S. Cl.
USPC .. 362/555; 362/569; 362/249.02; 362/311.02; 362/311.06; 362/810

(58) Field of Classification Search
USPC .............. 362/555, 569, 249.02, 311.02, 362/311.06–311.1, 311.13, 329, 310, 810
See application file for complete search history.

(56) References Cited

U.S. PATENT DOCUMENTS

| | | | | |
|---|---|---|---|---|
| 5,343,330 | A * | 8/1994 | Hoffman et al. | 359/708 |
| 5,786,665 | A * | 7/1998 | Ohtsuki et al. | 313/512 |
| 6,819,505 | B1 * | 11/2004 | Cassarly et al. | 359/726 |
| 6,819,506 | B1 * | 11/2004 | Taylor et al. | 359/726 |
| 7,021,797 | B2 * | 4/2006 | Minano et al. | 362/355 |
| 7,168,839 | B2 * | 1/2007 | Chinniah et al. | 362/555 |
| 7,275,849 | B2 * | 10/2007 | Chinniah et al. | 362/555 |
| 7,329,029 | B2 * | 2/2008 | Chaves et al. | 362/329 |
| 7,980,727 | B2 * | 7/2011 | Munro et al. | 362/231 |
| 2004/0012976 | A1 * | 1/2004 | Amano | 362/511 |
| 2010/0142207 | A1 * | 6/2010 | Yoneda et al. | 362/296.07 |
| 2010/0208456 | A1 * | 8/2010 | Huang | 362/231 |

FOREIGN PATENT DOCUMENTS

| | | |
|---|---|---|
| CN | 101206271 A | 6/2008 |
| CN | 201259104 Y | 6/2009 |

(Continued)

*Primary Examiner* — Peggy Neils
*Assistant Examiner* — Erin Kryukova
(74) *Attorney, Agent, or Firm* — Li & Cai Intellectual Property (USA) Office (57) ABSTRACT

The present invention relates to a light-guiding cover and an illumination device having the same. The light-guiding cover, for guiding light beams emitted by at least one light-emitting diode (LED), has a light-guiding portion and a light output portion. The light-guiding portion has a light input surface for transmitting light beams thereto and a connecting surface. The light output portion formed on one end of the light-guiding portion has an optical surface adjoining the connecting surface. The light-guiding cover is substantially symmetrical and defines a central axis. The light beams received by the light-guiding portion are guided by the light input surface for light reflection from one side to another side of the optical surface across the central axis to exit from the light-output portion. Thus, the illumination device having the light-guiding cover can illuminate in an omni-directional manner.

19 Claims, 8 Drawing Sheets

(56) References Cited

FOREIGN PATENT DOCUMENTS

| CN | 102374494 | A | 3/2012 |
| JP | 11-185514 | A | 7/1999 |
| TW | 201030281 | A | 8/2010 |
| TW | 201209346 | A1 | 3/2012 |

* cited by examiner

LIGHT-GUIDING COVER AND ILLUMINATION DEVICE HAVING THE SAME

BACKGROUND OF THE INVENTION

1. Field of the Invention

The present invention relates to an illumination device; more particularly, to a light-guiding cover for housing at least one light-emitting diode (LED) and an illumination device having the same.

2. Description of Related Art

Conventional illumination devices include the use of tungsten lamps (incandescent light bulbs) and fluorescent lamps. These light sources emit light radially outward in an omni-directional manner. For different applications, the illumination devices often come with different light covers, where the light covers may vary in surface patterns and/or colors.

However, as the LEDs become more improved, the use of tungsten and fluorescent lamps is gradually diminishing. Nevertheless, the light emitted by an LED is directional. Namely, the light dispersion output from the LEDs are generally in the forward direction also offering only approximately no more than 180 degrees of coverage. The restricted illumination range is unlike the conventional tungsten or fluorescent lamps. The directional characteristic of the LEDs also tends to produce glare, which also limit the application range of the LEDs.

SUMMARY OF THE INVENTION

The present invention provides a light-guiding cover and an illumination device having the same. The light-guiding cover allows the light emitted by the LED to travel in certain optical paths, such that the illumination angle may be increased and lateral illumination can be achieved. Accordingly, light can be dispersed from a light output portion of the light-guiding cover in an omni-directional manner similar to the conventional tungsten lamps. Glare due to the LEDs may also be reduced effectively.

Furthermore, the illumination device of the present invention does not need any external transparent glass cover as traditional. Thus, the physical structure and aesthetic appearance of the illumination device may appear visually pleasing to the users.

The light-guiding cover of the present invention is solid and integrally formed in one piece and used for directing light emitted by at least one LED. The light-guiding cover has a light-guiding portion and a light output portion. The light-guiding portion has a light input surface including a central surface and an annular surface on one end thereof, which receives light beams coming from the LED. The light input surface is separated from the LED and transmits the light into the light-guiding portion. The light-guiding portion further has a connecting surface. The light output portion is adjacent to the light-guiding portion. Moreover, the light output portion has an optical surface extending from the connecting surface. The optical surface is arranged around the light output portion and gradually tapers away from the light-guiding portion. The light-guiding cover is substantially symmetrical and has a central axis. The light beams received by the light-guiding portion are guided by the light input surface for light reflection from one side to another side of the optical surface across the central axis to exit from the light-output portion.

The present invention further provides an illumination device having the aforementioned light-guiding cover. The illumination device comprises a mounting seat, at least one LED mounted on the mounting seat, and a light-guiding cover. The light-guiding cover is disposed on the mounting seat and around the LED.

Based on the light guiding characteristic of the light-guiding cover of the present invention, the illumination device having the light-guiding cover can illuminate in an omni-directional manner as a tungsten lamp. Furthermore, the illumination device having the light-guiding cover of the present invention can be visually appealing as conventional candle bulbs and expand the application range originally restricted due to inherent nature of the LEDs.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF EMBODIMENTS

First Embodiment

Figure 1:
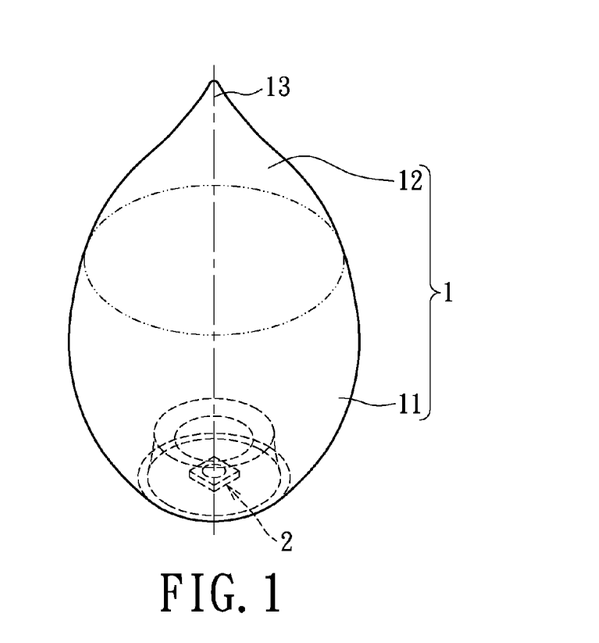
FIG. 1 is a perspective view of a light-guiding cover for a first embodiment of the present invention.
Figure 2:
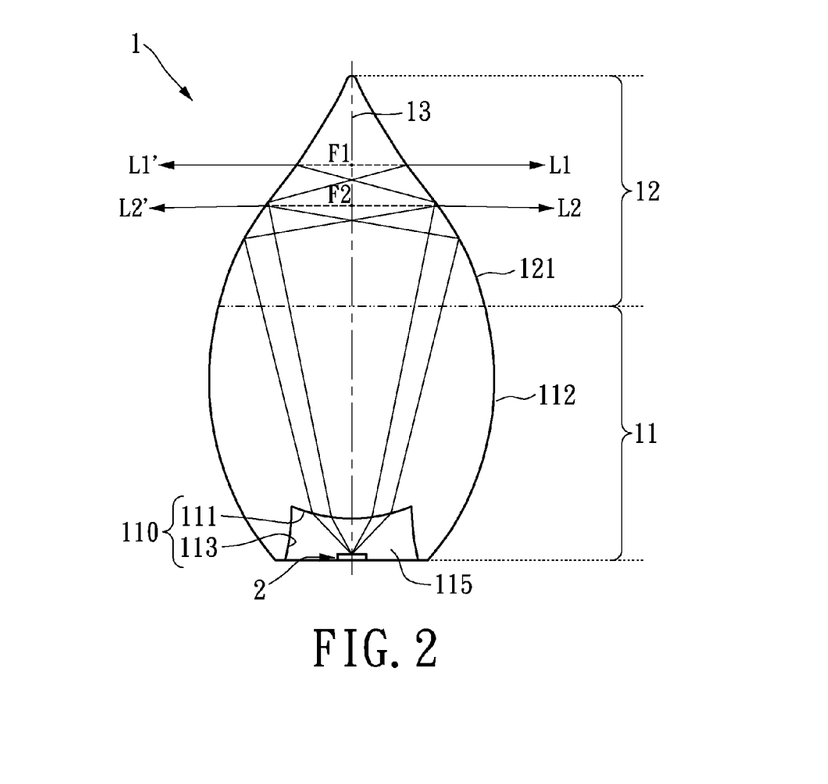
FIG. 2 shows the optical paths in the light-guiding cover in FIG. 1.
Figure 3:
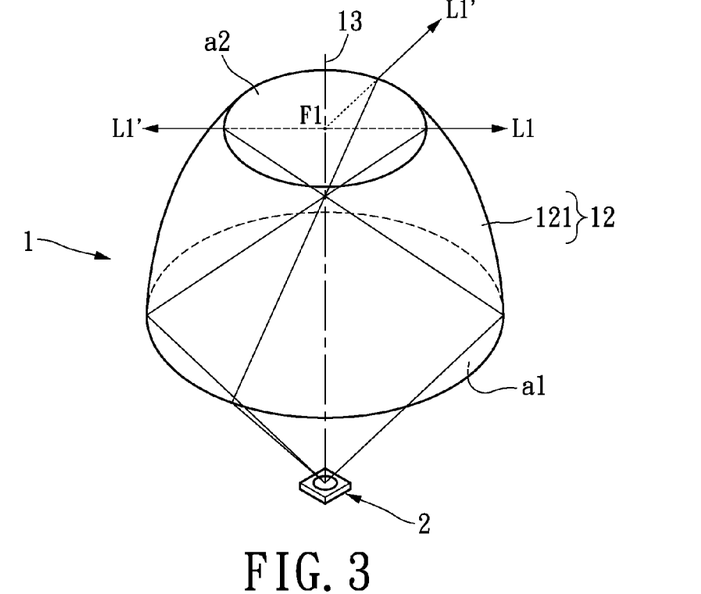
FIG. 3 is a partial perspective view of the light-guiding cover in FIG. 1 and optical paths traveled by the light beams.
Figure 4:
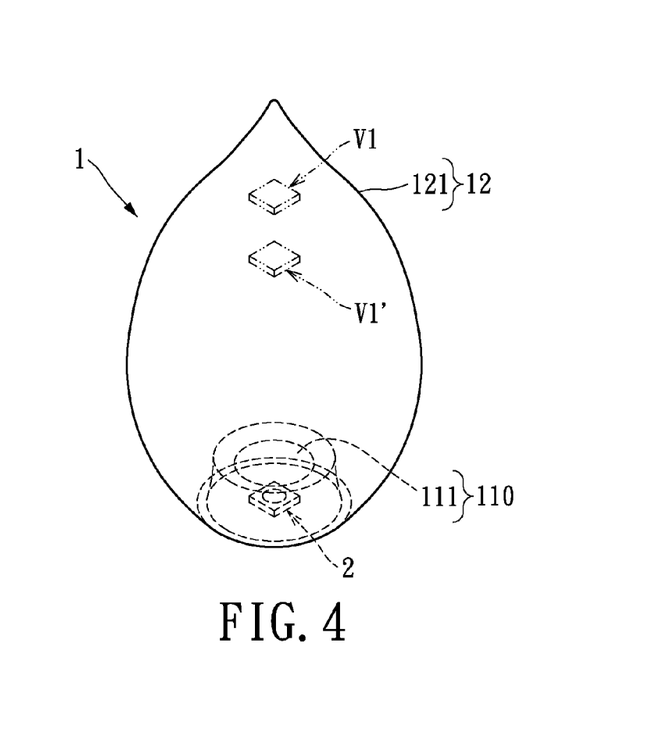
FIG. 4 shows virtual LEDs produced in the light-guiding cover in FIG. 1.
Figure 5:
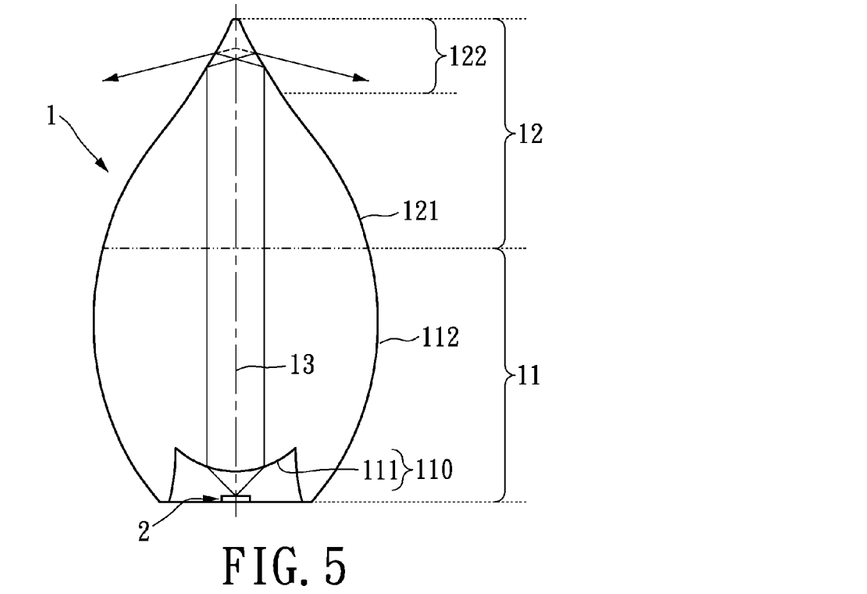
FIG. 5 shows virtual focal points produced in an upper end portion of a light output portion of the light-guiding cover in FIG. 1.
Figure 6:
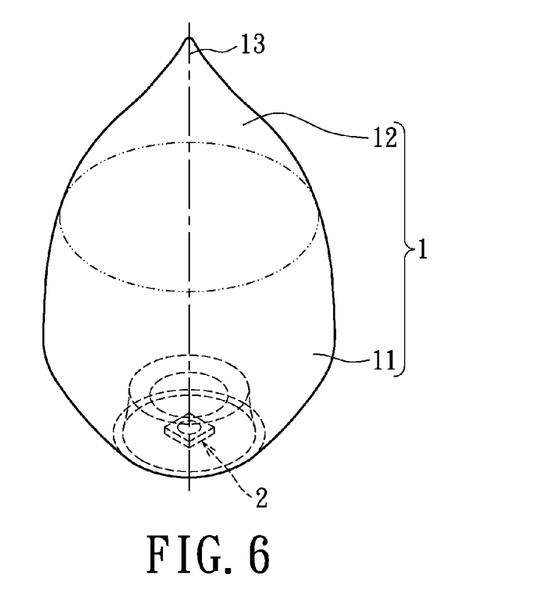
FIG. 6 is a perspective view of a light-guiding cover for a second embodiment of the present invention.

Please refer to FIGS. 1 to 5, which show a light-guiding cover 1 for a first embodiment of the present invention. Namely, FIGS. 1, 3, and 4 are the perspective views of the light-guiding cover 1. Whereas FIGS. 2, 3 and 5 show the light path in the light-guiding cover 1.

As shown in FIG. 1, the light-guiding cover 1 is used for guiding light emitted by an LED 2. For explanation purpose, a single LED 2 is used for the instant embodiment. However, in practice, the number of the LEDs 2 is not restricted, where an array of LEDs may be used.

The light-guiding cover 1 has a light-guiding portion 11 and a light output portion 12, where the light-guiding cover 1 is integrally formed in one piece. The light-guiding cover 1 has a central axis 13. The light-guiding portion 11 and the light output portion 12 are substantially symmetrical about the central axis 13. The LED 2 which, in the mounted condition shown in FIGS. 1~5, is on the central axis 13.

For the instant embodiment, the light-guiding cover 1 is symmetrical about the central axis 13. However, in practice, the light-guiding cover 1 may be only approximately symmetrical about the central axis 13 according to different requirements. For the instant embodiment, the light-guiding cover 1 is shaped like a candle flare or a chandelier bulb.

Moreover, the light-guiding cover 1 is a solid body made from glass, acrylic glass, polyethylene (PE), poly(methyl acrylate), or any suitable combinations.

Please refer to FIGS. 2~4. The light-guiding portion 11 has a light input surface 110. In this embodiment, the light input surface 110, comprising a central surface 111 and an annular surface 113, is configured to be concave in one end of the light-guiding portion 11 for receiving light beams emitted by the LED 2. The central surface 111, located at the bottom center of the light-guiding cover 1, is on the central axis 13. The annular surface 113 extends from the periphery of the central surface 111 toward the LED 2. The central surface 111 and the annular surface 113 cooperatively define an accommodating space 115 for hosting the LED 2. The central surface 111 and the annular surface 113 are separated from the LED 2 and transmit the light beams coming from the central portion and the peripheral portion of the LED 2, respectively, to the light-guiding portion 11. The light-guiding portion 11 further has a connecting surface 112 connected to the annular surface 113 and surrounded the light input surface 110.

For the instant embodiment, the central surface 111 is a curved surface but not limited thereto. In practice, the central surface 111 may be a free-form surface, a multi-segmented surface, a leveled surface, a Fresnel-lens like surface, or any other suitable surface.

Likewise, the annular surface 113 of the instant embodiment is a curved surface but not limited thereto. In practice, the annular surface 113 may be a leveled surface, a parabolic surface, a free-form surface, a multi-segmented surface, or any other suitable surface.

The light output portion 12 is formed extendingly from another end of the light-guiding portion 11 opposite of the light input surface 110. The light output portion 12 has an optical surface 121. The optical surface 121 extends from one end of the connecting surface 112 away from the central surface 111. The optical surface 121 is substantially symmetrical about the central axis 13 and gradually tapers away from the light-guiding portion 11. In other words, the distance between the optical surface 121 and the central axis 13 gradually decreases in a direction away from the light-guiding portion 11. For the instant embodiment, the optical surface 121 allows the light to reflect or pass therethrough. Light reflections by the optical surface 121 are total internal reflections.

The optical surface 121 of the instant embodiment is a curved surface. In other words, the optical surface 121 may be a parabolic surface, a free-form surface, a multi-segmented surface, or any other surface with suitable shape. The cross-section of the light output portion 12 normal to the central axis 13 is substantially circular-shaped but is not limited thereto. In addition, the optical surface 121 may have a non-smooth texture. For example, the optical surface 121 may be hazed or have localized protrusions, convexities, or concavities to further diffuse the light uniformly. Thereby, the light output portion 12 of the light-guiding cover 1 may illuminate in a manner to better engender soothing and visually pleasing lighting effects.

Moreover, the optical paths provided by the light-guiding cover 1 allow the majority of the light beams that enter the light-guiding cover 1 to disperse from the light output portion 12. Accordingly, the light-guiding cover 1 may illuminate in an omni-directional manner as a tungsten lamp. The light-guiding cover 1 also reduces glare associated with the LEDs.

To further understand the optical paths inside the light-guiding cover 1, FIGS. 2 and 3 are illustrated with solid lines to represent the optical paths traveled by the light beams. However, the optical paths are not restricted thereto. As shown in FIG. 2, a light beam L1 coming from the LED 2 is refracted by the central surface 111 and enters the light-guiding portion 11. The light beam L1 received by the light-guiding portion 11 is guided by the central surface 111 for light reflection from one side to another side of the optical surface 121 across the central axis 13 to exit from the light-output portion 12.

More specifically, as shown in FIG. 3, when the light beam L1 is refracted to the optical surface 121 on one side of the central axis 13, the light beam L1 meets the optical surface 121 of the light output portion 12 at the periphery of a defined cross-section a1 of the light-guiding cover 1. The light beam L1 is then reflected to another side of the optical surface 121 by passing through the central axis 13. The reflected light beam L1 meets the optical surface 121 at the periphery of a cross-section a2 defined on the light-guiding cover 1. The area of the cross-section a2 is less than the area of the cross-section a1.

Likewise, a light beam L1' emanating from the same light source as the light beam L1 also travels in a same manner to exit from the light output portion 12. Thus, a virtual focal point F1 is produced on the central axis 13 by the exiting light beams L1, L1'.

Under the same principle, light beams L2, L2' emanating from the LED 2 create a virtual focal point F2, as shown in FIG. 2, on the central axis 13. To the user, the light seems to originate from the virtual focal points F1, F2. In addition, other light beams (not shown) emanating from the LED 2 produce a plurality of virtual focal points on the central axis 13 after being refracted by the central surface 111, thus give rise to a virtual filament to provide the user a candle-like visual perception. However, the number and position of the virtual light sources may be varied according to the user and the operating environment.

The formation of the virtual focal points F1, F2 is further explained hereinbelow. When the light beams L1, L1', L2, and L2' emanate from the LED 2, the distance between the light beams L1, L1' and the central axis 13 is closer than the distance between the light beams L2, L2' and the central axis 13. The central surface 111 has a certain curvature such that as the light beams L1, L1', L2, and L2' pass therethrough, the angles subtended between the light beams L1, L1' and the central axis 13 are smaller than the angles subtended between the light beams L2, L2' and the central axis 13. Then, based on a certain curvature of the optical surface 121, the light beams L1, L1', L2, and L2' are reflected in producing the virtual focal points F1, F2. The distance between the virtual focal point F1 and the LED 2 is greater than the distance between the virtual focal point F2 and the LED 2.

Moreover, the light beams L1, L1' emanate from the same location of the LED 2. Light beams (not shown) emanate from other locations on the LED 2 may produce a plurality of virtual focal points in proximity to the virtual focal point F1.

Thus, a virtual point-like LED V1 may be produced at the virtual focal point F1, as shown in FIG. 4.

Likewise, another virtual point-like LED V1' may be produced at the virtual focal point F2, as also seen in FIG. 4.

Thereby, when the light-guiding cover 1 is arranged over the LED 2, the cover 1 can illuminate in an omni-directional manner with the virtual LEDs V1, V1' being at the center thereof. In other words, the light-guiding cover 1 can illuminate in an omni-directional manner like conventional tungsten lamps.

Besides, the reflection of light beams by the optical surface 121 is total internal reflection. Thus, the light-guiding cover 1 is enabled to provide improved light-guiding and light-emitting effects, by dispersing the light more uniformly in the central and peripheral directions Also, by changing the respective curvatures of the central surface 111 and the optical surface 121, the locations of the virtual focal points (or virtual LEDs) can be varied on the central axis 13.

For example, as shown in FIG. 5, the curvature of the central surface 111 is being increased. As previously mentioned, virtual focal points are produced when the light beams are guided by the central surface 111 and the optical surface 121. However, with the increased curvature, the virtual focal points are produced further away from the LED 2 in comparison to the aforementioned virtual focal points F1, F2. Accordingly, the virtual LEDs are produced in an upper end portion 122 of light-guiding cover 1 opposite of the LED 2.

The term "upper end portion 122" is referred herein as the narrow portion of the optical surface 121 having a different curvature from the broader portion of the optical surface 121.

Two virtual LEDs V1, V1' are produced for the instant embodiment but is not limited thereto. In practice, the central surface 111 and the optical surface 121 may be designed to produce a single or multiple virtual LEDs in the light output portion 12 of the light-guiding cover 1.

Second Embodiment

Please refer to FIGS. 6~10, which show a light-guiding cover 1 for a second embodiment of the present invention. In comparison to the previous embodiment, the light-guiding portion 11 of the instant embodiment has a reflecting surface 114. The reflecting surface 114 provides additional optical paths for light beams in the light-guiding cover 1.

Figure 7:
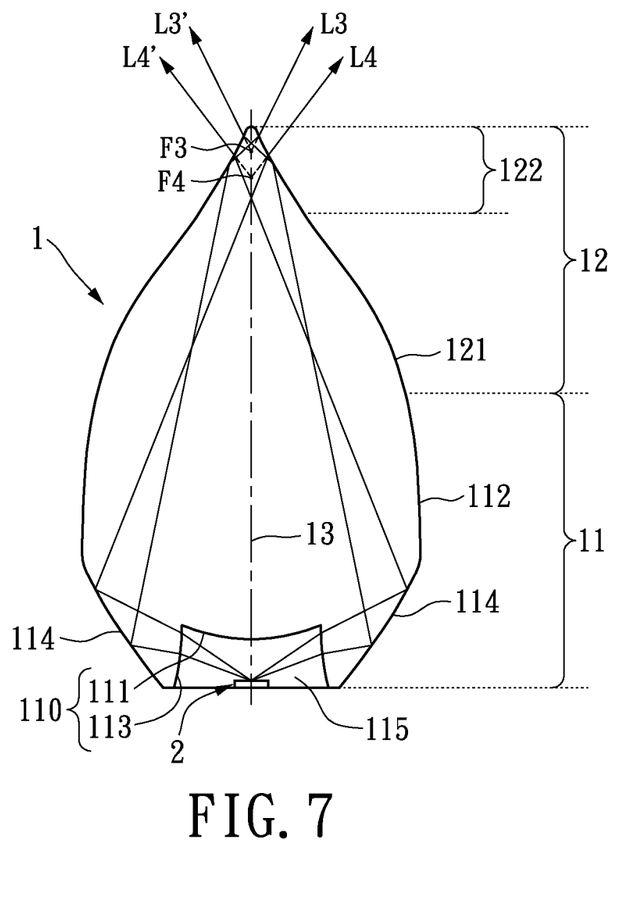
FIG. 7 shows the optical paths in the light-guiding cover in FIG. 6.

Please refer to FIG. 7. The light-guiding portion 11 has the connecting surface 112 and the reflecting surface 114. The connecting surface 112 gradually tapers in a direction away from the LED 2. In other words, the distance between the connecting surface 112 and the central axis 13 gradually decreases in a direction away from the LED 2.

The reflecting surface 114 is formed extendingly from the connecting surface 112 in a direction away from the optical surface 121. The distance between the reflecting surface 114 and the central axis 13 gradually decreases in a direction away from the connecting surface 112. Light reflection by the reflecting surface 114 is total internal reflection.

For the instant embodiment, the reflecting surface 114 is a curved surface but not restricted thereto. In practice, the reflecting surface 114 may be a leveled surface, a parabolic surface, a free-form surface, a multi-segmented surface, or any other surface with suitable shape.

To further explain the optical paths in the light-guiding cover 1, FIG. 7 is illustrated with solid lines to represent symmetrical optical paths traveled by the light beams. However, the optical paths are not restricted thereto.

As shown in FIG. 7, a light beam L3 emanating from the LED 2 is refracted by the annular surface 113 upon entering the light-guiding portion 11. The refracted light beam L3 is received by the reflecting surface 114, which reflects the light beam L3 to a generic point on the optical surface 121 on one side of the central axis 13. The reflected light beam L3 is redirected by the aforementioned optical surface 121 to another generic point on the optical surface 121 on the other side of the central axis 13, where the light beam L3 exits from the light output portion 12.

Likewise, a light beam L4 emanating from the LED 2 is refracted by the annular surface 113 upon entering the light-guiding portion 11. The refracted light beam L4 is received by the reflecting surface 114, which reflects the light beam L4 to a generic point on the optical surface 121 on one side of the central axis 13. The reflected light beam L4 is redirected by the aforementioned optical surface 121 to another generic point on the optical surface 121 on the other side of the central axis 13, where the light beam L4 exits from the light output portion 12.

As previously mentioned in the first embodiment, where the virtual focal point F1 is generated by the light beams L1, L1', virtual focal points F3, F4 are generated by the light beams L3, L3' and L4, L4' from the LED 2 on the central axis 13 at the upper end portion 122 of the light output portion 12, respectively. In addition to the light beams L3, L3', L4, L4', other light beams (not shown) emanating from the LED 2 would generate a plurality of virtual focal points on the central axis 13 in the upper end portion 122 of the light output portion 12, after being guided by the annular surface 113 and the reflecting surface 114. The virtual focal points produce the visual effect of a virtual filament. However, the number and position of the virtual focal point (virtual light source) may be varied according to the user or the operating environment.

The formation of the virtual focal points F3, F4 is further explained hereinbelow. The annular surface 113 has a certain curvature such that as the light beams L3, L3', L4, L4' pass therethrough, the angles subtended between the light beams L3, L3' and the central axis 13 are larger than the angles subtended between the light beams L4, L4' and the central axis 13. Thus, the distance between the virtual focal point F3 and the LED 2 is greater than the distance between the virtual focal point F4 and the LED 2.

Moreover, the light beams L3, L3' emanate from the same location of the LED 2. Light beams (not shown) emanate from other locations on the LED 2 may produce a plurality of virtual focal points in proximity to the virtual focal point F3. Thus, a virtual LED V2 may be produced at the virtual focal point F3, as illustrated in FIG. 8.

Figure 8:
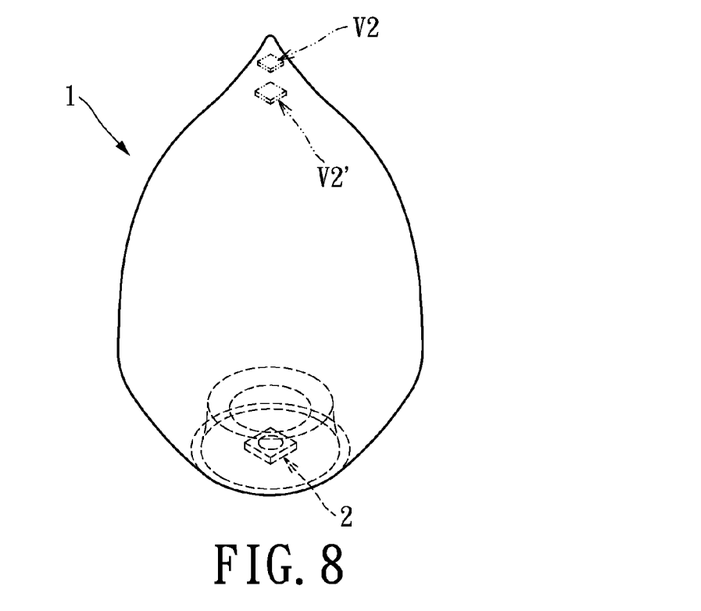
FIG. 8 shows the virtual LEDs produced by light beams passing through an annular surface of the light-guiding cover in FIG. 6.

Likewise, another virtual LED V2' (as shown in FIG. 8) is produced at the virtual focal point F4 in the light-guiding cover 1. Notably, the virtual LEDs V2, V2' may be very close to one another in the upper end portion 122 of the light output portion 12. The close proximity may results in overlapping virtual images, with the user being able to identify only a single virtual LED visually.

Thereby, when the light-guiding cover 1 is arranged over the LED 2, the upper end portion 122 of the light output portion 12 of the light-guiding cover 1 can illuminate in an omni-directional manner with the virtual LEDs V2, V2' being at the center thereof. In other words, the light-guiding cover 1 can emit light in an omni-directional manner like conventional tungsten lamps.

Figure 9:
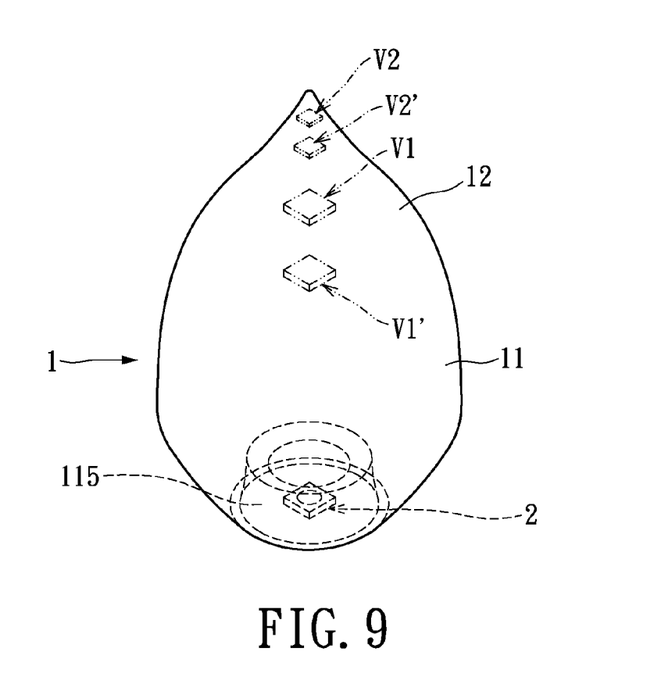
FIG. 9 shows the light-guiding cover in FIG. 6 at operating state.

Please note, FIG. 8 is used for describing the formation of the virtual LEDs V2, V2' only, rather than for illustrating the imaging effect of the light-guiding cover 1 in operating condition. When using the light-guiding cover 1 of the instant embodiment, four virtual LEDs V1, V1', V2, V2' are presented concurrently (as shown in FIG. 9), but is not restricted thereto.

Also, by changing the curvature of the annular surface 113, the locations of the virtual focal points can be varied on the central axis 13 in the upper end portion 122 of the light output portion 12.

Figure 10:
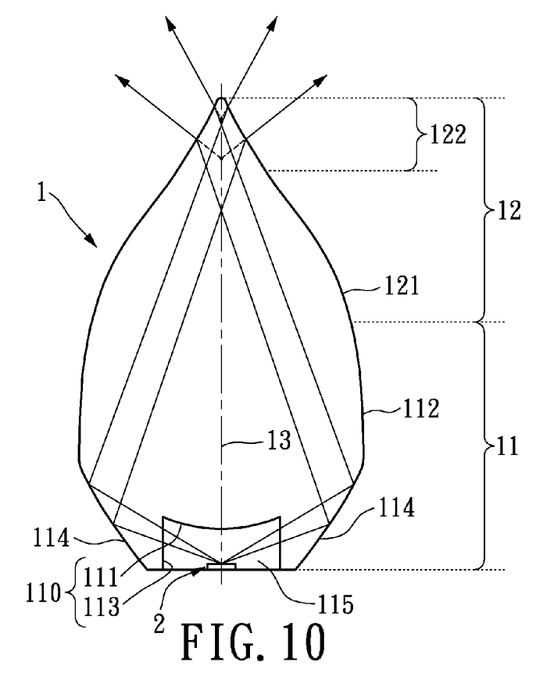
FIG. 10 shows the light-guiding cover in FIG. 6 having a leveled annular surface and optical paths traveled by the light beams.

Alternatively, the annular surface 113 may be a leveled surface, as shown in FIG. 10. When the light beams enter the light-guiding cover 1 through the annular surface 113, the optical paths traveled by the light beams are different in comparison to the optical paths taken by the aforementioned light beams L3, L3', L4, L4'. Correspondingly, virtual focal points are produced along the central axis 13 in the upper end portion 122 of the light output portion 12. The virtual LEDs (not show) are also produced accordingly in the upper end portion 122 of the light output portion 12. However, in comparison to the virtual focal points F3, F4, the virtual focal points produced by the leveled annular surface 113 are arranged at different positions along the central axis 13.

The redirection of light beams by the reflecting surface 114 is total internal reflection. Thus, the light-guiding cover 1 is capable of providing improved light-guiding and light-emitting effects, allowing the light to be dispersed more uniformly in the central and peripheral directions.

For the instant embodiment, the light-guiding cover 1 is shaped substantially like a candle flare or a chandelier bulb. Thus, the shape change of the light-guiding cover 1 may in turn add additional optical paths, while maintain the light-guiding cover 1 to be aesthetically appealing.

Third Embodiment

Figure 11:
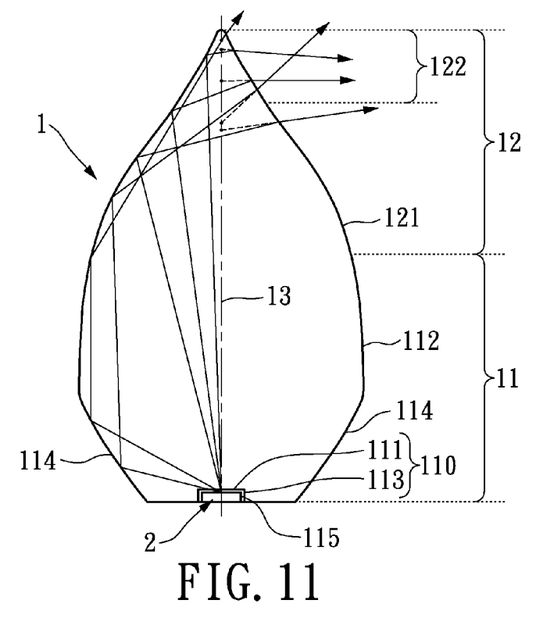
FIG. 11 shows the optical paths in a light-guiding cover for a third embodiment of the present invention.

Please refer to FIG. 11, which shows a light-guiding cover 1 for a third embodiment of the present invention. In comparing to the second embodiment, the main difference being: the accommodating space 115 is sized substantially the same as the LED 2.

More specifically, the central surface 111 is substantially in contact with the light emitting surface of the LED 2 (i.e., the central surface 111 is physically touching the LED 2 or having a clearance formed therewith). The annular surface 113 is also substantially in contact with the side portions of the LED 2. Regarding the optical paths traveled by the light beams emanating from the LED 2, FIG. 11 is illustrated with solid lines to represent the optical paths. However, the optical paths are not restricted thereto.

The light beams emanating from the LED 2 enters the light guiding portion 11 through the central surface 111, where two types of optical paths are produced in the light guiding portion 11.

For the first type of optical path, a light beam is guided directly to a generic point on the optical surface 121 on one side of the central axis 13. The above-mentioned optical surface 121 redirects the light beam to another generic point on the optical surface 121 on the other side of the central axis 13, where the light beam exits from the light output portion 12.

For the second type of optical path, a light beam is guided directly to the reflecting surface 114. The reflecting surface 114 reflects the light beam to a generic point on the optical surface 121 on one side of the central axis 13. The reflected light beam is redirected by the aforementioned optical surface 121 to another generic point on the optical surface 121 on the other side of the central axis 13, where the light beam exits from the light output portion 12.

Moreover, the above-described optical paths allow a plurality of virtual focal points to be formed along the central axis 13 in the light output portion 12. Thus, a virtual filament can be produced visually. The positions of the virtual focal points may be adjusted by changing the curvatures of the optical surface 121 and/or the reflecting surface 114.

Figure 12:
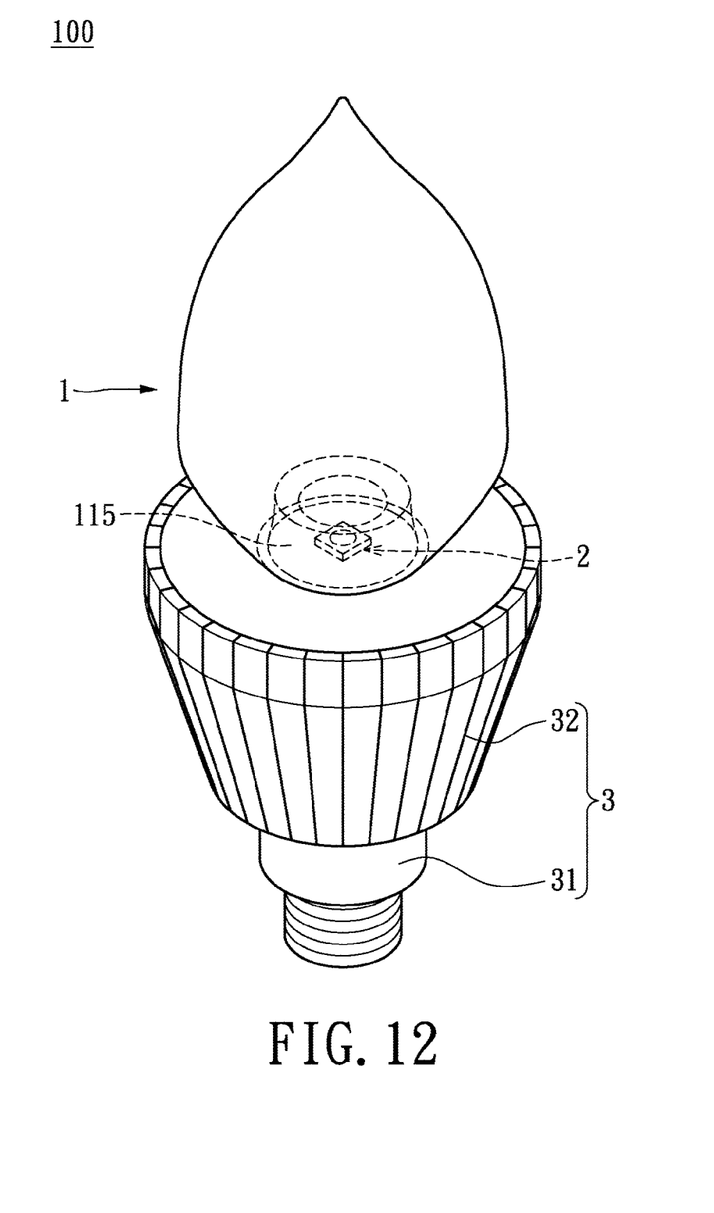
FIG. 12 is a perspective view of an illumination device having the light-guiding cover of the present invention.
Figure 13:
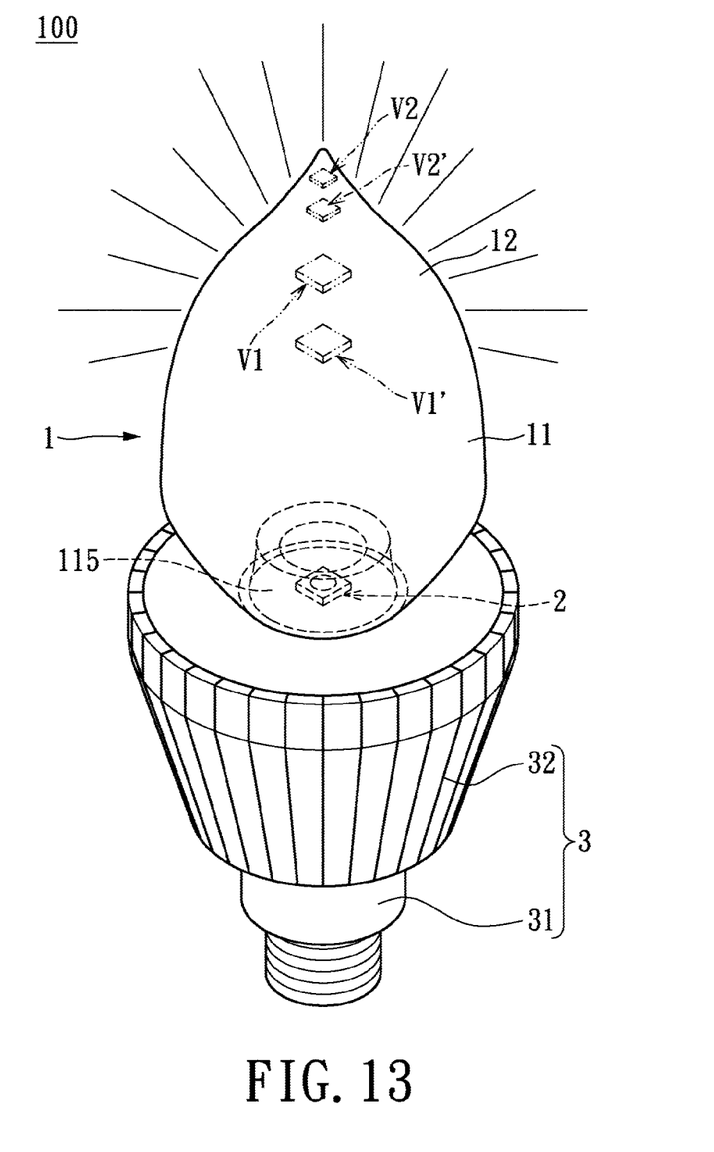
FIG. 13 is a perspective view of the illumination device having the light-guiding cover of the present invention in use.

Please refer to FIGS. 12 and 13, which show an illumination device 100 having the above-described light-guiding cover 1. The illumination device 100 comprises a mounting seat 3, the LED 2 disposed on the mounting seat 3, and the light-guiding cover 1 disposed on the mounting seat 3 and spaced apart from the LED 2.

The mounting seat 3 has a lamp cap 31 and a heat sink 32, where the lamp cap 31 is arranged on one end of the heat sink 32. The LED 2 is arranged on the opposite end of the heat sink 32, and the heat generated by the LED 2 can be transferred to the heat sink 32 and then be dissipated. The LED 2 is electrically connected to the lamp cap 31.

The light-guiding cover 1, as discussed in this instant disclosure hereof, may be any of the light-guiding cover 1 from the previous embodiments. The light-guiding cover 1 is arranged on the heat sink 32, and the LED 2 is received by the accommodating space 115 of the light-guiding cover 1.

When power is conducted through the lamp cap 31, the LED 2 will emit light. As shown in FIG. 13, light beams emanating from the LED 2 are being guided by the light-guiding cover 1. Virtual LEDs V1, V1', V2, V2' are produced centrally in the light-guiding cover 1, and the light-guiding cover 1 produces an omni-directional lighting effect. The lighting effect generated by the light-guiding cover 1 is similar to conventional tungsten lamps or candle bulbs.

Advantages

For the light-guiding cover 1 and the illumination device 100 using the same, virtual focal points may be produced along the central axis 13 of the light-guiding cover 1 to create the virtual filament and virtual LEDs.

When using the illumination device 100 having the above-described light-guiding cover 1, the light-guiding cover 1 can illuminate in an omni-directional manner with virtual LEDs formed inside thereof centrally. Thus, the illumination device 100 can have similar lighting effect as conventional tungsten lamps or candle bulbs. The directional lighting characteristic inherent in the operation of an LED light source may thus be overcome through the present invention.

Moreover, the light-guiding cover 1 is shaped like a candle flare or a chandelier bulb. Thus, the illumination device 100 having the light-guiding cover 1 is aesthetically pleasing without the need to furbish additional ornamentations. Thereby, manufacturing cost and assembling time of the illumination devices 100 can be saved.

The descriptions illustrated supra set forth simply the preferred embodiments of the present invention; however, the characteristics of the instant disclosure are by no means restricted thereto. All changes, alternations, or modifications conveniently considered by those skilled in the art are deemed to be encompassed within the scope of the present invention delineated by the following claims.

What is claimed is:

1. A light-guiding cover, integrally formed in solid one piece for guiding light beams emitted from at least one light-emitting diode (LED), comprising:
    a light-guiding portion, wherein a light input surface is formed on one end of the light-guiding portion and orientated toward an LED, wherein the light input surface transmits light beams emanating from the LED into the light-guiding portion, wherein the light-guiding portion—further has a connecting surface; and a light output portion extending from another end of the light-guiding portion, wherein the light output portion has an optical surface extending from the connecting surface, wherein the overall profile shape of the light output portion is tapered away from the light-guiding portion to an upper end portion of the light output portion away from the LED;

wherein the light-guiding cover is substantially symmetrical around a central axis, each cross-section of the light output portion normal to the central axis is substantially circular, wherein the diameters of the cross-sections of the light output portion decrease in a direction away from the light-guiding portion, and the optical surface allows the light beams emanating from the LED to reflect or pass therethrough, and wherein the light beams emanating from the LED are refracted by the light input surface and enters the light-guiding portion for light reflection from one side to another side of the optical surface across the central axis to exit from the light-output portion, wherein at least one virtual LED is produced on the central axis in the upper end portion of the light output portion away from the LED by the light beams transmitted by the light input surface into the light-guiding portion.

2. The light-guiding cover of claim 1, wherein the light input surface has a central surface and an annular surface, and the annular surface is formed adjacent to the central surface, wherein the central surface and the annular surface cooperatively define an accommodating space for receiving the LED.

3. The light-guiding cover of claim 2, wherein the central surface is a free-form surface, a multi-segmented surface, a flat leveled surface, or a Fresnel lens-like surface, and the annular surface is a flat leveled surface, a parabolic surface, a free-form surface, or a multi-segmented surface, while the optical surface is a parabolic surface, a free-form surface, or a multi-segmented surface.

4. The light-guiding cover of claim 3, wherein the optical surface is a total internally reflective surface.

5. The light-guiding cover of claim 4, wherein the optical surface is a non-smooth surface.

6. The light-guiding cover of claim 2, wherein the light-guiding portion further has a reflecting surface, wherein the connecting surface adjoins the optical surface and the reflecting surface on opposite ends thereof, wherein the reflecting surface is formed extendingly from the connecting surface away from the optical surface, with the distance between the reflecting surface and the central axis gradually decreases in a direction away from the connecting surface, and wherein the reflecting surface reflects light beams transmitted by the annular surface to the optical surface.

7. The light-guiding cover of claim 1, wherein the light-guiding cover is a solid structure made from glass, acrylic glass, polyethylene (PE), poly(methyl acrylate), or any suitable combination thereof.

8. The light-guiding cover of claim 1, wherein the light-guiding cover is shaped like a candle flare or a chandelier bulb.

9. An illumination device, comprising:
a mounting seat;
at least one LED disposed on the mounting seat for emitting light beams; and
a light-guiding cover disposed on the mounting seat for guiding light beams emitted from the LED, wherein the light-guiding cover is integrally formed in solid one piece and comprises:
a light-guiding portion, wherein a light input surface is formed on one end of the light-guiding portion and orientated toward the LED, wherein the light input surface transmits light beams emanating from the LED into the light-guiding portion, wherein the light-guiding portion further has a connecting surface; and
a light output portion extending from another end of the light-guiding portion, wherein the light output portion has an optical surface extending from the connecting surface, wherein the overall profile shape of the light output portion is tapered away from the light-guiding portion to an upper end portion of the light output portion away from the LED;
wherein the light-guiding cover is substantially symmetrical around a central axis, each cross-section of the light output portion normal to the central axis is substantially circular, wherein the diameters of the cross-sections of the light output portion decrease in a direction away from the light-guiding portion, and the optical surface allows the light beams emanating from the LED to reflect or pass therethrough, and wherein the light beams emanating from the LED are refracted by the light input surface and enters the light-guiding portion for light reflection from one side to another side of the optical surface across the central axis to exit from the light-output portion, wherein at least one virtual LED is produced on the central axis in the upper end portion of the light output portion away from the LED by the light beams transmitted by the light input surface into the light-guiding portion.

10. The illumination device of claim 9, wherein the mounting seat includes a lamp cap and a heat sink, wherein the lamp cap and the LED are arranged on opposite ends of the heat sink, with the LED being electrically connected to the lamp cap.

11. The illumination device of claim 9, wherein the light input surface has a central surface and an annular surface, and the annular surface is formed adjacent to the central surface, wherein the central surface and the annular surface cooperatively define an accommodating space for receiving the LED.

12. The illumination device of claim 11, wherein the central surface is a free-form surface, a multi-segmented surface, a flat leveled surface, or a Fresnel lens-like surface, and the annular surface is a flat leveled surface, a parabolic surface, a free-form surface, or a multi-segmented surface, while the optical surface is a parabolic surface, a free-form surface, or a multi-segmented surface.

13. The illumination device of claim 12, wherein the optical surface is a non-smooth surface.

14. The illumination device of claim 12, wherein at least one virtual LED is produced on the central axis by the light beams transmitted by the light input surface into the light-guiding portion.

15. The illumination device of claim 11, wherein the light-guiding portion further has a reflecting surface, wherein the connecting surface adjoins the optical surface and the reflecting surface on opposite ends thereof, wherein the reflecting surface is formed extendingly from the connecting surface away from the optical surface, with the distance between the reflecting surface and the central axis gradually decreases in a direction away from the connecting surface, and wherein the reflecting surface reflects light beams transmitted by the annular surface to the optical surface.

16. The illumination device of claim 11, wherein the central surface is substantially in contact with a light emitting surface of the LED, and the annular surface is substantially in contact with side portions of the LED.

17. The illumination device of claim 12, wherein the optical surface is a total internally reflective surface.

18. The illumination device of claim 9, wherein the light-guiding cover is shaped like a candle flare or a chandelier bulb.

19. The illumination device of claim 9, wherein the light-guiding cover is a solid structure made from glass, acrylic glass, polyethylene (PE), poly(methyl acrylate), or any suitable combination thereof.

* * * * *